US009522609B2

United States Patent
Lee et al.

(10) Patent No.: US 9,522,609 B2
(45) Date of Patent: Dec. 20, 2016

(54) THERMAL MANAGEMENT SYSTEM FOR FUEL CELL VEHICLES

(71) Applicant: Hyundai Motor Company, Seoul (KR)

(72) Inventors: Min Kyu Lee, Incheon (KR); Hun Woo Park, Namyangju (KR); Seung Yong Lee, Yongin (KR); Sung Wook Na, Yongin (KR); Ki Young Nam, Gyeonggi-Do (KR); Su Dong Han, Gyeonggi-Do (KR); Hyung Kook Kim, Gyeonggi-Do (KR); Hark Koo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 36 days.

(21) Appl. No.: 14/559,999

(22) Filed: Dec. 4, 2014

(65) Prior Publication Data

US 2015/0183338 A1 Jul. 2, 2015

(30) Foreign Application Priority Data

Dec. 31, 2013 (KR) .................. 10-2013-0168543
Jun. 24, 2014 (KR) .................. 10-2014-0077101

(51) Int. Cl.
*B60L 11/18* (2006.01)
*H01M 8/04* (2016.01)
(Continued)

(52) U.S. Cl.
CPC ............ *B60L 11/1892* (2013.01); *B60L 1/003* (2013.01); *B60L 3/0053* (2013.01); *B60L 11/1883* (2013.01); *B60L 11/1898* (2013.01); *H01M 8/04007* (2013.01); *H01M 8/04029* (2013.01); *H01M 8/04723* (2013.01); *H01M 8/04768* (2013.01); *B60L 2200/10* (2013.01); *B60L 2200/18* (2013.01); *B60L 2200/32* (2013.01); *B60L 2200/36* (2013.01); *B60L 2240/36* (2013.01); *Y02T 90/34* (2013.01)

(58) Field of Classification Search
CPC ............. B60L 11/1888; B60L 11/1892; B60L 11/1898; H01M 8/04723; H01M 8/04007; H01M 8/04029; H01M 8/04768
See application file for complete search history.

(56) References Cited

U.S. PATENT DOCUMENTS 6,182,749 B1 2/2001 Brost et al.
6,997,143 B2 2/2006 Piccirilli et al.
(Continued)

FOREIGN PATENT DOCUMENTS

JP 2004-014484 A 1/2004
KR 10-2012-0078542 A 7/2012
(Continued)

*Primary Examiner* — Scott J Chmielecki
(74) *Attorney, Agent, or Firm* — Mintz Levin Cohn Ferris Glovsky and Popeo, P.C.; Peter F. Corless

(57) ABSTRACT

A thermal management system is provided which may be miniaturized and may have a reduced weight by integrating thermal management parts in a fuel cell vehicle. In particular, a new type of thermal management system integrated housing in which a housing of a pump housing part, a housing of a 3-way valve fluid part, and a bypass channel among parts of the thermal management system for a fuel cell vehicle are integrated into a single structure to reduce the size of the overall system.

8 Claims, 7 Drawing Sheets

(51) Int. Cl.
*B60L 1/00* (2006.01)
*B60L 3/00* (2006.01)

(56) References Cited

U.S. PATENT DOCUMENTS

| | | |
|---|---|---|
| 8,459,389 B2 | 6/2013 | Myers et al. |
| 8,485,226 B2 | 7/2013 | Na |
| 2004/0237912 A1 | 12/2004 | Pawellek et al. |
| 2005/0095473 A1* | 5/2005 | Sakakida .......... H01M 8/04029 429/413 |
| 2008/0032168 A1* | 2/2008 | Fujita ................ H01M 8/04029 429/434 |
| 2009/0169928 A1* | 7/2009 | Nishimura ........ H01M 8/04037 429/415 |
| 2009/0280395 A1* | 11/2009 | Nemesh ............. B60H 1/00278 429/62 |
| 2009/0304531 A1* | 12/2009 | Vanderwees ...... H01M 8/04029 417/279 |
| 2015/0372329 A1* | 12/2015 | Jomori ................. B60L 3/0053 429/432 |

FOREIGN PATENT DOCUMENTS

| | | |
|---|---|---|
| KR | 10-2013-0026665 A | 3/2013 |
| WO | 2013/089357 A1 | 6/2013 |

* cited by examiner

THERMAL MANAGEMENT SYSTEM FOR FUEL CELL VEHICLES

CROSS-REFERENCE TO RELATED APPLICATION

This application claims under 35 U.S.C. §119(a) the benefit of Korean Patent Application Nos. 10-2013-0168543 filed Dec. 31, 2013 and 10-2014-0077101 filed Jun. 24, 2014, the entire contents of which are incorporated herein by reference.

BACKGROUND (a) Technical Field

The present disclosure relates to a thermal management system for a fuel cell vehicle. More particularly, it relates to a thermal management system which may be miniaturized and may have a reduced weight by integrating thermal management parts in a fuel cell vehicle.

(b) Background Art

Generally, a fuel cell, being an apparatus directly converting fuel energy into electrical energy, is a system which is made up of a pair of electrodes consisting of an anode and a cathode having electrolytes disposed therebetween. As such, a fuel cell obtains electricity and heat by an electrochemical reaction of ionized fuel gas.

One type of fuel cell is a polymer electrolyte membrane fuel cell. In particular, polymer electrolyte membrane fuel cells may have a high current density, a low operation temperature, a less corrosion and electrolyte loss, and a high output density. These types of fuel cells may also be modularized due to their simple structure. Therefore, a study for applying the polymer electrolyte membrane fuel cell as a power source of a vehicle has been actively conducted over the past few decades.

At present, a fuel cell system applied to a fuel cell vehicle includes a fuel cell stack generating electric energy from an electrochemical reaction of a reaction gas, a hydrogen supply apparatus configure to supply hydrogen, as a fuel, to the fuel cell stack, an air supply apparatus configured to supply air including oxygen as an oxidizer required for the electrochemical reaction to the fuel cell stack, a thermal management system configured to optimally control an operation temperature of the fuel cell stack by emitting/dissipating heat, which is an electrochemical reaction byproduct of the fuel cell stack, away from the stack, and the like.

In a fuel cell system, the efficiency of a fuel cell is approximately 50% and therefore as much energy as is output is also emitted as heat. As such, a large amount of heat is generated during the use of the fuel cell. In particular, a polymer electrolyte membrane fuel cell should be maintained at a temperature t within a range of approximately 25° C. (normal temperature) to 80° C. in order to allow for a sufficient lifespan and performance and to obtain a stabilized output state.

For example, a fuel cell stack in the fuel cell system typically generates electrical energy from the electrochemical reaction of hydrogen and oxygen and emits heat and water as the reaction byproducts. Therefore, to prevent the temperature of the fuel cell stack from rising in the fuel cell system, the thermal management system is employed typically to cool the fuel cell stack and other components within the system.

Generally, thermal management systems generally cool the fuel cell stack by circulating water through a cooling water channel within the fuel cell stack in order to maintain the fuel cell stack within an optimal temperature range.

In particular, a thermal management system generally includes a cooling water line connected between the fuel cell stack and a radiator to circulate the cooling water, a bypass line and a 3-way valve installed to bypass the cooling water around the radiator, a pump that pumps the cooling water a through the cooling water line, a heater that heats the cooling water, and the like.

However, in thermal management systems for a fuel cell vehicle, parts are generally individually developed and therefore the number of parts and man-hours required to assemble the thermal management system are increased. Additionally, these systems typically generate a lot of dead space. This makes it very difficult to achieve the required miniaturization and weight reduction of the thermal management system required by vehicle manufactures while still securing the performance and durability of the thermal management system.

For example, it is difficult to reduce the connection space between pump-pipe and the 3-way valve. This connection spaces increases the differential pressure due between these parts as well as reduces the flow rate and cooling performance, etc.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure provides a thermal management system for a fuel cell vehicle capable of achieving miniaturization and weight reduction of the thermal management system and enhancing a level of performance and durability of the thermal management system by implementing a new type of thermal management system (TMS) integrated housing in which a housing of a pump fluid part, a housing of a 3-way valve fluid part, and a bypass channel the thermal management system for a fuel cell vehicle are integrated.

In order to achieve the above object, a thermal management system for a fuel cell vehicle according to an exemplary embodiment of the present disclosure has the following features. In one aspect, the present disclosure provides a thermal management system for a fuel cell vehicle, including: a radiator configured to cool a fluid; a fluid line configured to circulate the fluid between the radiator and a fuel cell stack; a bypass channel configured to bypass the fluid around the radiator; a pump that circulates the fluid; and a 3-way valve configured to switch a fluid flow path between the fluid line and the bypass channel. In particular, the system also includes an TMS integrated housing configured to be provided within a pump housing part connected to a fluid inlet and a fluid outlet which are connected to an outlet of the fuel cell stack and an inlet of the radiator, a 3-way valve housing part connected to the fluid inlet and the fluid outlet which are connected to an outlet of the radiator and an inlet of the fuel cell stack, and the bypass channel connecting between the pump housing part and the 3-way valve housing part.

Accordingly, the heat management system for a fuel cell vehicle may be miniaturized and may have a reduced weight by integrally forming housing portions of parts in the TMS integrated housing.

In a preferred embodiment, a discharge portion of the bypass channel connected to the 3-way valve housing part within the TMS integrated housing may be connected to a heater housing part to transfer the fluid exiting the bypass channel to the 3-way valve housing part via the heater housing part.

In another preferred embodiment, a front end of the pump housing within the TMS integrated housing may be connected to a bubble separating reservoir that separates bubbles to transfer the fluid introduced through the fluid inlet to the pump housing via the bubble separating reservoir.

In still another preferred embodiment, the bubble separating reservoir may include a valve that sends bubbles to outside of the housing at the time of expanding the fluid and introduce the fluid into the inside thereof at the time of contracting the fluid.

The thermal management system for a fuel cell vehicle according to the exemplary embodiments of the present disclosure has the following advantages.

First, it is possible to achieve the miniaturization and weight reduction so that hoses and/or pipes can be removed from the system. Additionally, the amount pipe in the entire system can be reduced by integrating the thermal management parts.

Second, it is possible to secure constant performance and durability of the system by integrating the thermal management parts.

Third, it is possible to reduce the number of parts and man-hour required to assemble the system by integrating the thermal management parts.

Therefore, according to the exemplary embodiments of the present disclosure, it is possible to reduce the differential pressure within the system and the amount of space required by the system due to the removal unnecessary hoses and pipes by integrating the volute, hose channel and 3-way valve.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
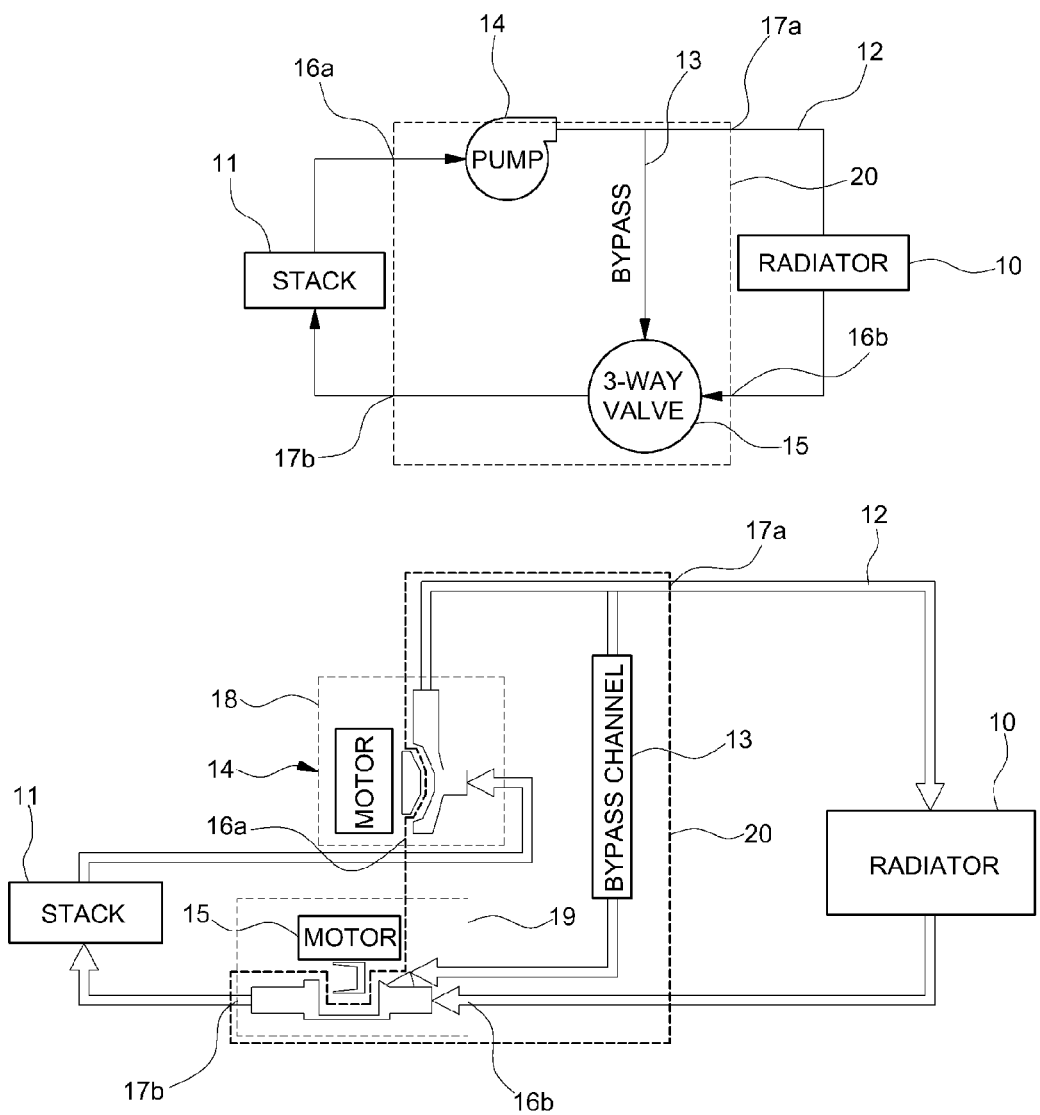
FIG. 1 is a diagram schematically illustrating a thermal management system for a fuel cell vehicle according to an exemplary embodiment of the present disclosure.

| 10: radiator | 11: fuel cell stack |
|---|---|
| 12: fluid line | 13: bypass channel |
| 14: pump | 60: 3-way valve |
| 16a, 16b: fluid inlet | 17a, 17b: fluid outlet |
| 18: pump housing part | 19: 3-way valve housing part |

-continued

| 20: TMS integrated housing | 21: heater housing part |
|---|---|
| 22: bubble separating reservoir | 23: valve (pressing cap) |
| 24: heater | 25: connection passage part |

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a diagram schematically illustrating a thermal management system for a fuel cell vehicle according to an exemplary embodiment of the present disclosure.

As illustrated in FIG. 1, the thermal management system has a structure in which a housing part of a pump, a housing part of a 3-way valve, a bypass channel, and the like are disposed inside a single TMS integrated housing to miniaturize and reduce the weight of the thermal management system.

To this end, the thermal management system includes a radiator 10 that cools a fluid and a fuel cell stack 11, in which the radiator 10 and the fuel cell stack 11 may be connected to each other by a fluid line 12 to implement a circulation flow of the fluid, for example, cooling water between the radiator 10 and the fuel cell stack 11.

The thermal management system may be embodied as a unit which provides power to circulate the fluid and includes an pump 14 (e.g., electric), a bypass channel 13 as a unit which bypasses the fluid around the radiator 10, a 3-way valve 15 as a unit which selectively switches a flow of the fluid toward the bypass channel 13 or toward the radiator 10, and the like.

By this configuration, the fluid of the thermal management system circulates to the radiator 10 to the 3-way valve 15 then to the fuel cell stack 11 then the pump 14. Alternatively, the fluid may be circulated on through the bypass channel 13 to the 3-way valve 15 then to fuel cell stack 11 then the pump 14 along the fluid line 12 when the pump 14 is operated, thereby performing a cooling action, and the like on the fuel cell stack.

In the exemplary embodiment of the present invention, a pump housing part 18 which is a passage portion through which the fluid moves in the pump 14, a 3-way valve housing part 19 which is a passage portion through which the fluid moves in the 3-way valve 15, and the bypass passage 13 are all integrally formed inside the TMS integrated housing 20.

One side of the TMS integrated housing 20 is provided with a fluid inlet 16a to which the fluid line 12 extending from an outlet of the fuel cell stack 11 is connected and the other side thereof is provided with a fluid outlet 17a to which the fluid line 12 extending to an inlet of the radiator 10 is connected.

On the other hand, one portion of a front surface of the TMS integrated housing 20 is provided with a fluid inlet 16b to which the fluid line 12 extending from the outlet of the radiator 10 is connected and one portion of a bottom surface thereof adjacent to the fluid inlet 16b is connected to a fluid outlet 17b to which the fluid line 12 extending to an inlet of the fuel cell stack 11 is connected.

Therefore, a basic flow in which the fluid incoming into the TMS integrated housing 20 through the fluid inlet 16a of the one side of the TMS integrated housing 20, passes through the pump housing part 18, and the like and is then discharged to a fluid outlet 17a of the other side thereof and the fluid incoming into the TMS integrated housing 20 through the fluid inlet 16b of the front surface thereof, passes through the 3-way valve housing part 19 and is then discharged to the fluid outlet 17b of the bottom surface thereof may be formed.

The pump housing part 18 of the pump 14 may include a channel through which the fluid introduced into the pump including an impeller moves, a suction portion of the housing part is connected to the fluid inlet 16a of the TMS integrated housing 20 for connecting the fluid line 12 extending from the outlet of the fuel cell stack 11, and a discharge portion of the housing part is connected to the fluid outlet 17a of the TMS integrated housing 20 for connecting the fluid line 12 extending to the inlet of the radiator 10 through a connection passage part 25. In this way, when the pump housing part 18 is modularized in the TMS integrated housing 20, a volute may be applied to a module. This is done by using an engraved structure.

Figure 4A:
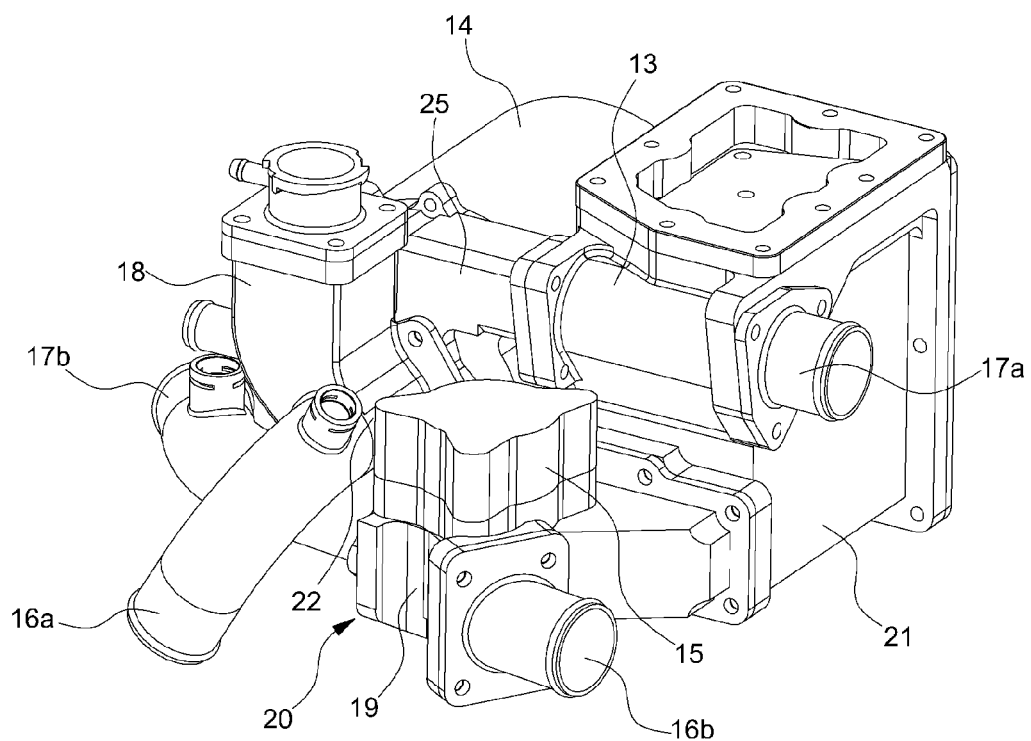
FIGS. 4A to 4D are perspective views illustrating one implementation example of the thermal management system for a fuel cell vehicle according to the exemplary embodiment of the present disclosure; and Reference numerals set forth in the Drawings includes reference to the following elements as further discussed below.
Figure 4B:
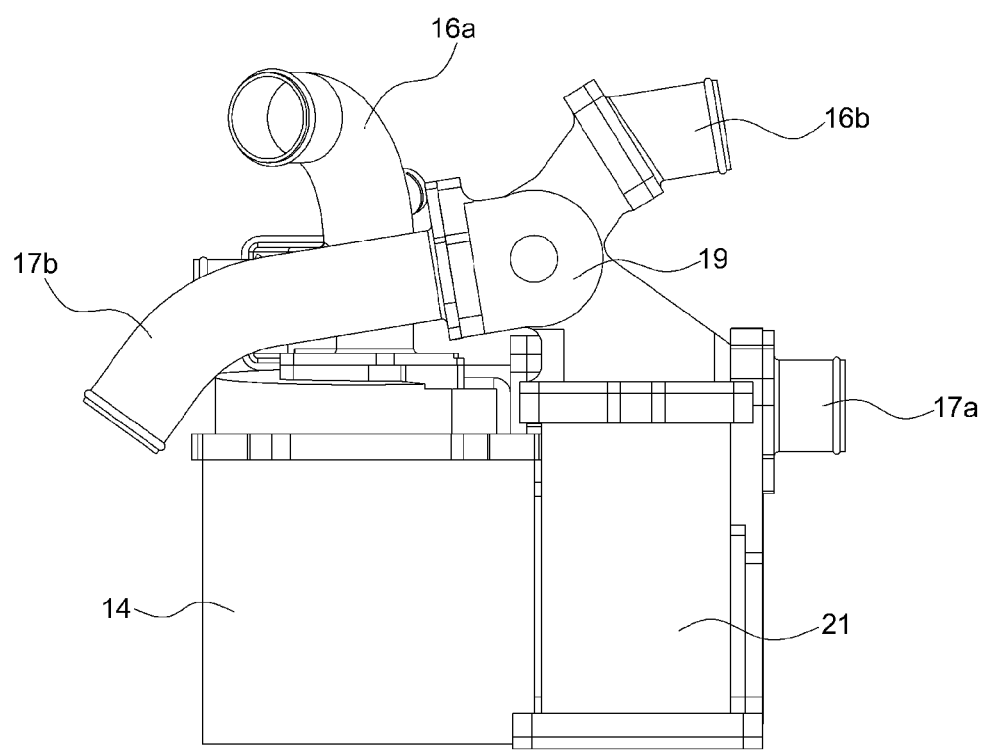
Figure 4C:
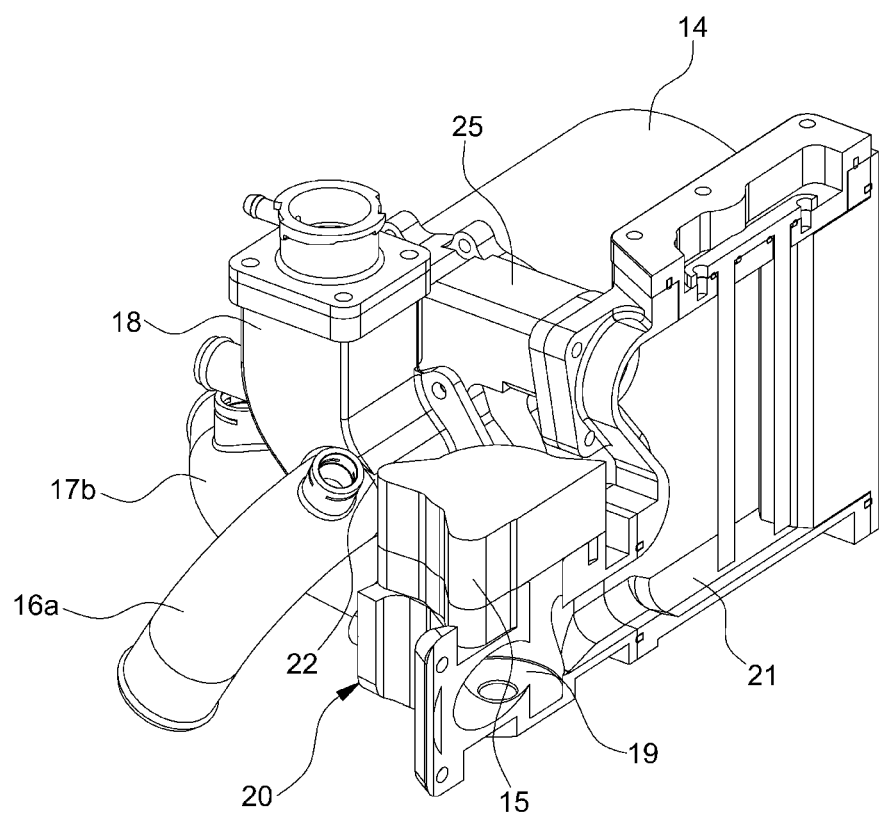
Figure 4D:
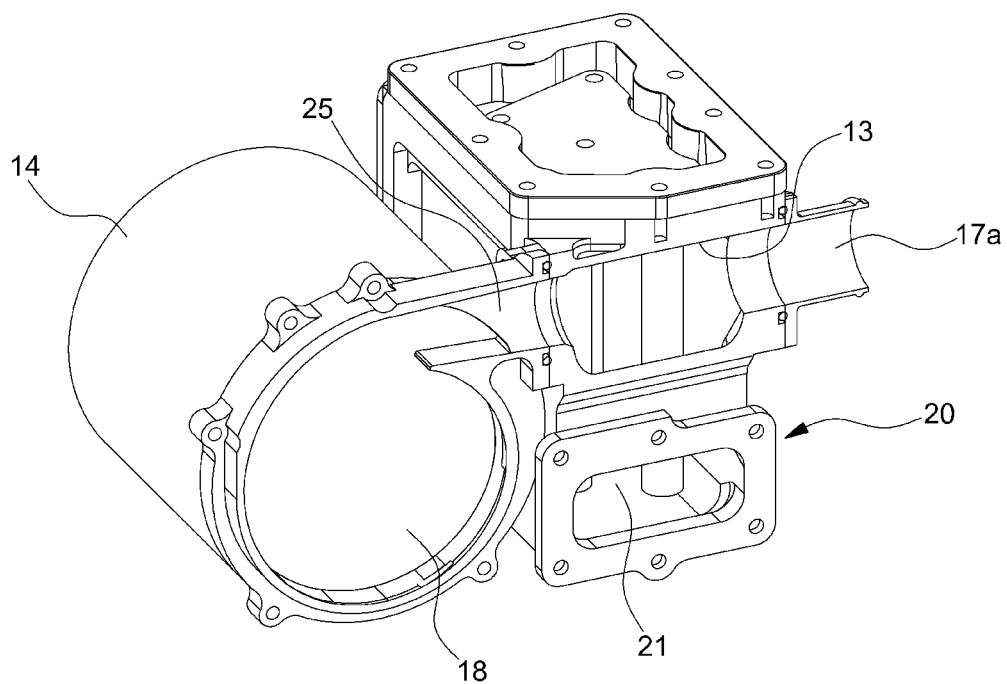

Herein, as illustrated in FIG. 4A, the pump and a pump body other than the pump housing part 18 of the pump 14 are mounted to be supported to one side of a back surface of the TMS integrated housing 20. The 3-way valve housing part 19 of the 3-way valve 15 may include a channel through which the fluid introduced into the valve including a valve body and a driving part moves, the suction portion of the housing part is connected to the fluid inlet 16b of the TMS integrated housing 20 for connecting the fluid line 12 extending from the outlet of the radiator 10 and a heater housing part 21 to be described below, and a discharge portion of the housing part is connected to the fluid outlet 17b of the TMS integrated housing 20 for connecting the fluid line 12 extending to the inlet of the fuel cell stack 11.

As illustrated in FIG. 4A, the valve body other than the 3-way valve housing part 19 of the 3-way valve 15 is mounted to be supported to a front portion of a top surface of the TMS integrated housing 20. The bypass channel 13 is a passage through which the fluid transferred from the pump 14 to the radiator 10 is bypassed and is mounted to be connected between the connection passage part 25 extending from the discharge portion of the pump housing part 18 within the housing at a position adjacent to the fluid outlet 17a of the TMS integrated housing 20 and the suction portion of the 3-way valve housing part 19. This suction portion is a suction portion of another housing part which is disposed at an opposite side to the suction portion of the housing part to which the fluid inlet 16b of the TMS integrated housing 20 is connected (when the heater housing part is not applied).

Figure 2:
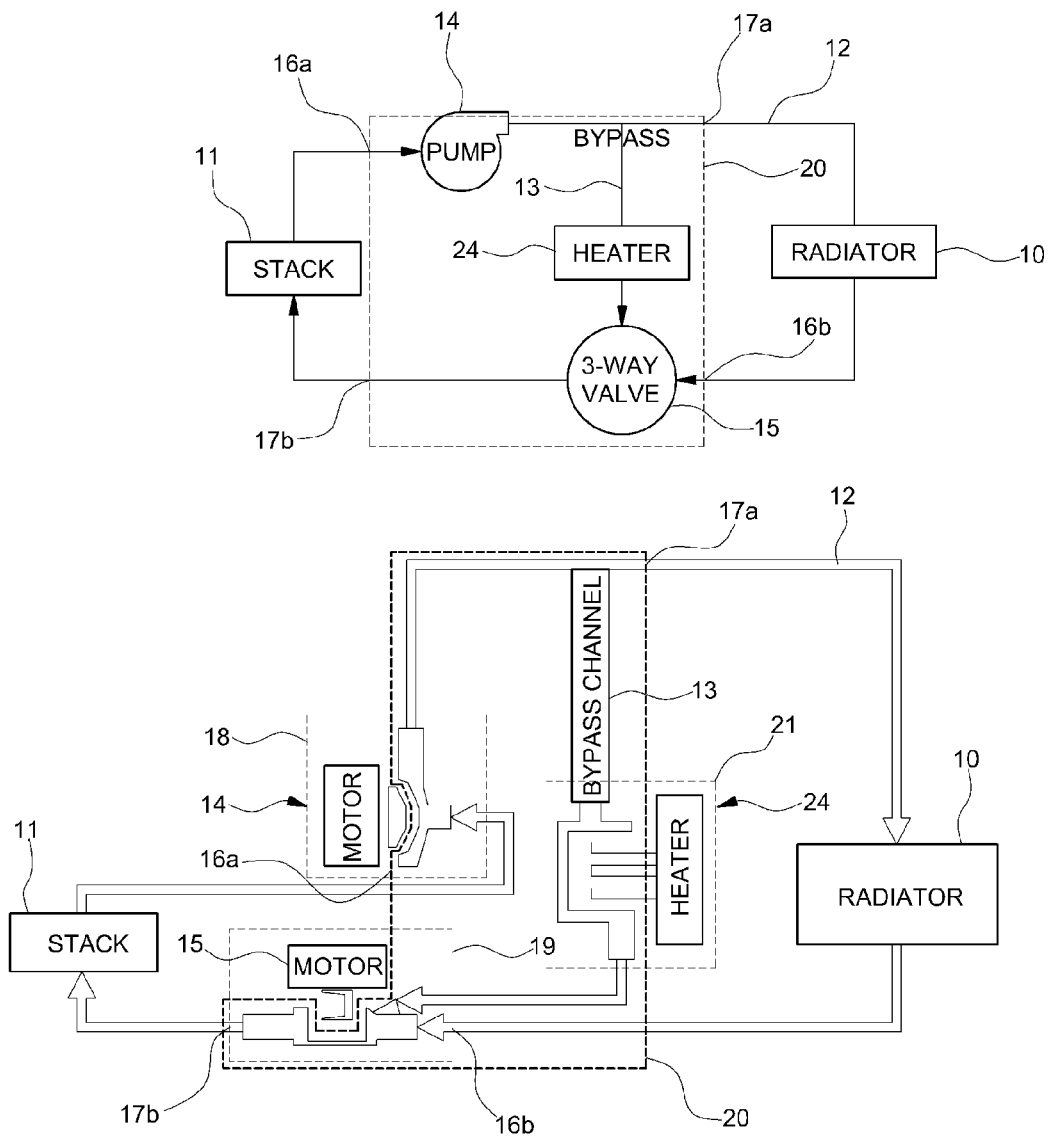
FIG. 2 is a diagram schematically illustrating a thermal management system for a fuel cell vehicle according to another exemplary embodiment of the present disclosure.

FIG. 2 is a diagram schematically illustrating a thermal management system for a fuel cell vehicle according to another exemplary embodiment of the present disclosure. As illustrated in FIG. 2, a structure in which the housing part of the heater is included in the integrated module illustrated in the first exemplary embodiment of the present disclosure is illustrated herein.

That is, the heater housing part 21 of a heater 24 includes a channel through which the fluid introduced into the heater having a heater core moves and is mounted to be connected between a back end of the bypass channel 13 within the housing at a position adjacent to the fluid outlet 17a of the TMS integrated housing 20 and the suction portion of the 3-way valve housing part 19. This suction portion is the suction portion of the housing part of the TMS integrated housing 20 to which the bypass channel 13 is connected.

As illustrated in FIG. 4A, a heater body other than the heater housing part 21 of the heater 24 is mounted to be supported by one portion of a back surface of the TMS integrated housing 20, that is, one side of the pump body. Therefore, the fluid flowing through the bypass channel 13 may be heated while passing through the heater housing part 21 and then may be transferred to the 3-way valve housing part 19. In this configuration, a power part of the heater 24 may increase the temperature uniformity of a surface of the heater due to heater rods that are uniformly disposed.

Figure 3:
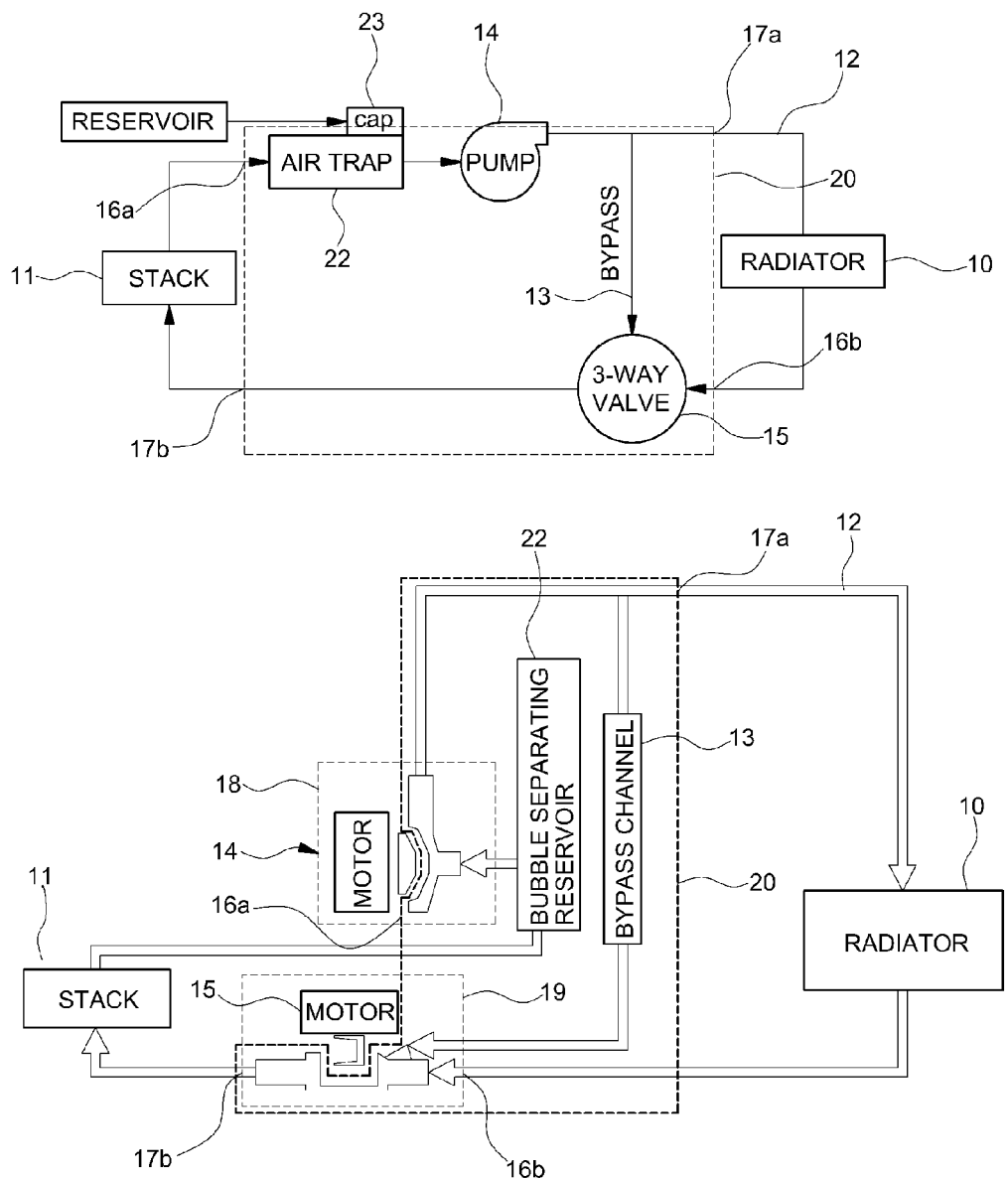
FIG. 3 is a diagram schematically illustrating a thermal management system for a fuel cell vehicle according to still another exemplary embodiment of the present disclosure.

FIG. 3 is a diagram schematically illustrating a thermal management system for a fuel cell vehicle according to still another exemplary embodiment of the present disclosure. As illustrated in FIG. 3, a structure in which a bubble separating reservoir for separating bubbles is included in the integrated module illustrated in the second exemplary embodiment of the present disclosure is illustrated herein.

That is, the bubble separating reservoir 22 is disposed inside the housing at a position adjacent to the fluid inlet 16a of the TMS integrated housing 20 and a front end and a back end thereof are each mounted in a structure which is connected between the fluid inlet 16a and the suction portion of the pump housing part 18. Therefore, after bubbles in the fluid coming into the housing through the fluid inlet 16a of the TMS integrated housing 20 are removed by passing through the bubble separating reservoir 22, the fluid may be transferred to the pump housing part 18.

In this case, the bubble separating reservoir 22 may be provided with a valve (not illustrated). In this case, the valve may serve to transfer bubbles outside of the housing during fluid expansion and to introduce the fluid into the housing during fluid contraction.

FIGS. 4A to 4D are perspective views illustrating one implementation example of the thermal management system for a fuel cell vehicle according to the exemplary embodiment of the present disclosure. As illustrated in FIGS. 4A to 4D, the TMS integrated housing 20 including the fluid inlet 16a connected to the outlet of the fuel cell stack 11, the fluid outlet 17a connected to the inlet of the radiator 10, the fluid inlet 16b connected to the outlet of the radiator 10, and the fluid outlet 17b connected to the inlet of the fuel cell stack 11 is prepared. A back surface of the TMS integrated housing 20 is provided with the pump body and the heater body in parallel and the top surface thereof is provided with the valve body.

In particular, the inside of the TMS integrated housing 20 is continuously provided with the fluid inlet 16a, the bubble separating reservoir 22, the pump housing part 18, and the fluid outlet 17a is continuously provided with the bypass channel 13 and the heater housing part 21 via the connection passage part 25.

The fluid inlet 16b and the fluid outlet 17b are continuously provided with the 3-way valve housing part 19 and the so disposed 3-way valve housing part 19 is continuously provided with the heater housing part 21. Therefore, the flow of the fluid within the TMS integrated housing 20 may show a flow from the fluid inlet 16a into the bubble separating reservoir 22 then the pump housing part 18 then the connection passage part 25 and out through the fluid outlet 17a. Alternatively, a flow may be through the fluid inlet 16a then into the bubble separating reservoir 22 then into the pump housing part 18 then connection passage part 25 then the bypass channel 13 then the heater housing part 21 then the 3-way valve housing part 19 and then out through fluid output 17b.

The overall flow of the fluid of the thermal management system may show a circulation flow from the fuel cell stack 11 into the fluid inlet 16a then the bubble separating reservoir 22 then pump housing part 18 then connection passage part 25 then out through the fluid outlet 17a then through radiator 10 back into the fluid inlet 16a into 3-way valve housing part 19 then out through fluid outlet 17b then into the fuel cell stack 11 during normal operation. Alternatively, the overall flow of the fluid of the thermal management system may show a circulation flow of through the fuel cell stack 11 then into the fluid inlet 16a into to bubble separating reservoir 22 then the pump housing part 18 next into the connection passage part 25 through the bypass channel 13 into the heater housing part 21 through the 3-way valve housing part 19 and out through the fluid outlet 17b and back into the fuel cell stack 10 during bypass operation.

As described above, according to the exemplary embodiment of the present disclosure, the TMS integrated housing which may integrate the housing portions of the thermal management parts is implemented, such that the miniaturization and weight reduction of the thermal management system may be achieved, the performance and durability of the thermal management system may be secured, the number of parts may be reduced, and the number of man-hour required to assembly the system may be reduced.

For example, the space required for the existing pump discharge part and hose connection part may be reduced by integrating the hose channel into the module housing, the space required for a clamp connection between the discharge part and the hose, an additional connection part between the clamps, and the 3-way valve hose may be omitted by removing the hose channel, and the space required for mounting the 3-way valve housing part and the pump volute may be omitted by integrating the housing and pump volute in the module housing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A thermal management system for a fuel cell vehicle, comprising:
   a radiator configured to cool a fluid;
   a fluid line configured to circulate the fluid between the radiator and a fuel cell stack;
   a bypass channel configured to bypass the fluid;
   a pump configured to circulate the fluid;
   a 3-way valve configured to switch a fluid path between the fluid line and the bypass channel; and
   a thermal management system (TMS) integrated housing formed as a single body consisting essentially of: a pump housing part connected to a fluid inlet and a fluid outlet which are connected to an outlet of the fuel cell stack and an inlet of the radiator, respectively, a 3-way valve housing part connected to the fluid inlet and the fluid outlet which are connected to an outlet of the radiator and an inlet of the fuel cell stack, and the bypass channel connecting between the pump housing part and the 3-way valve housing part.

2. The thermal management system of claim 1, wherein a discharge portion of the bypass channel connected to the 3-way valve housing part within the TMS integrated housing is connected to a heater housing part to transfer the fluid exiting the bypass channel to the 3-way valve housing part via the heater housing part.

3. The thermal management system of claim 1, wherein a front end of the pump housing within the TMS integrated housing is connected to a bubble separating reservoir that separates bubbles to transfer the fluid introduced through the fluid inlet to the pump housing via the bubble separating reservoir.

4. The thermal management system of claim 3, wherein the bubble separating reservoir includes a valve configured to emit bubbles to outside of the housing during fluid expansion and introduce the fluid into the housing during fluid contraction.

5. The thermal management system of claim 1, wherein when the pump housing part is modularized in the TMS integrated housing, a volute is applied to the TMS integrated housing in an engraved structure.

6. A thermal management system for a fuel cell vehicle, comprising:
   a radiator configured to cool a fluid;
   a fluid line configured to circulate the fluid between the radiator and a fuel cell stack;
   a bypass channel configured to bypass the fluid;
   a pump configured to circulate the fluid;
   a 3-way valve configured to switch a fluid path between the fluid line and the bypass channel; and
   a single thermal management system (TMS) integrated housing consisting essentially of: a pump housing part connected to a fluid inlet and a fluid outlet which are connected to an outlet of the fuel cell stack and an inlet of the radiator, respectively, a 3-way valve housing part connected to the fluid inlet and the fluid outlet which are connected to an outlet of the radiator and an inlet of the fuel cell stack, and the bypass channel connecting between the pump housing part and the 3-way valve housing part,
   wherein the pump housing part, the 3-way valve housing part, and the bypass channel are disposed inside the single TMS integrated housing.

7. The thermal management system of claim 6, wherein one side of the single TMS integrated housing includes the fluid inlet to which a portion of the fluid line extending from the outlet of the fuel cell stack is connected, and another side of the single TMS integrated housing includes the fluid outlet to which another portion of the fluid line extending to the inlet of the radiator is connected.

8. The thermal management system of claim 6, wherein the single TMS integrated housing includes a second fluid inlet to which a portion of the fluid line extending from the outlet of the radiator is connected, and a bottom surface of the single TMS integrated housing adjacent to the second fluid inlet is connected to a second fluid outlet to which the fluid line stack extending to the inlet of the fuel cell stack is connected.

* * * * *